United States Patent [19]
Asawa

[11] Patent Number: 6,108,800
[45] Date of Patent: Aug. 22, 2000

[54] METHOD AND APPARATUS FOR ANALYZING THE PERFORMANCE OF AN INFORMATION SYSTEM

[75] Inventor: Manjari Asawa, Sunnyvale, Calif.

[73] Assignee: Hewlett-Packard Company, Palo Alto, Calif.

[21] Appl. No.: 09/021,190

[22] Filed: Feb. 10, 1998

[51] Int. Cl.⁷ .................................................. G06F 11/00
[52] U.S. Cl. ............................................ 714/47; 714/26
[58] Field of Search .................................. 714/47, 38, 4, 714/FOR 277, 44, 39, 26; 709/224, 226, 235; 702/182, 199, 186, 179, 190, 85, 27

[56] References Cited

U.S. PATENT DOCUMENTS

| | | | |
|---|---|---|---|
| 5,062,055 | 10/1991 | Chinnaswamy et al. | 702/182 |
| 5,287,506 | 2/1994 | Whiteside | 714/39 |
| 5,446,680 | 8/1995 | Sekiya et al. | 709/200 |
| 5,506,955 | 4/1996 | Chen et al. | 709/224 |
| 5,539,659 | 7/1996 | McKee et al. | 709/224 |
| 5,568,400 | 10/1996 | Stark et al. | 702/85 |
| 5,606,600 | 2/1997 | Elliot et al. | 379/112 |
| 5,634,009 | 5/1997 | Iddon et al. | 709/223 |
| 5,644,717 | 7/1997 | Clark | 709/224 |
| 5,655,074 | 8/1997 | Rauscher | 714/38 |
| 5,661,668 | 8/1997 | Yemini et al. | 702/186 |
| 5,696,701 | 12/1997 | Burgess et al. | 714/25 |
| 5,768,352 | 6/1998 | Elliot et al. | 379/112 |
| 5,781,703 | 7/1998 | Desai et al. | 706/50 |
| 5,781,729 | 7/1998 | Baker et al. | 709/230 |
| 5,793,954 | 8/1998 | Baker et al. | 709/250 |
| 5,796,633 | 8/1998 | Burgess et al. | 714/25 |
| 5,819,028 | 10/1998 | Manghirmalani et al. | 714/57 |
| 5,864,662 | 1/1999 | Brownmiller et al. | 714/43 |
| 5,872,912 | 2/1999 | Brownmiller et al. | 714/47 |
| 5,913,036 | 6/1999 | Brownmiller et al. | 709/224 |
| 5,954,826 | 9/1999 | Herman et al. | 714/46 |
| 5,961,598 | 10/1999 | Sime | 709/224 |

*Primary Examiner*—Robert W. Beausoliel, Jr.
*Assistant Examiner*—Pierre E. Elisca

[57] ABSTRACT

A method and apparatus for analyzing the performance of an information system which provides useful assessments of performance that apply to an aggregate of user nodes in the information system. The method and apparatus may be embodied in a performance analyzer which bases an assessment of the performance of the information system on a set of measurements of a performance parameter for each of the user nodes. The measurements in raw form apply to individual ones of the user nodes. The performance analyzer determines a set of filtered measurements by removing at least one type of variability in the measurements. The performance analyzer then determines a representative performance indication in response to the filtered measurements such that the representative performance indication applies to an aggregate of the user nodes. Information system operators are provided with indications of confidence in the applicability of filtered measurements to the aggregate of user nodes and are provided with alarms that are weighted by the indications of confidence.

24 Claims, 3 Drawing Sheets

METHOD AND APPARATUS FOR ANALYZING THE PERFORMANCE OF AN INFORMATION SYSTEM

BACKGROUND OF THE INVENTION

1. Field of Invention

The present invention pertains to the field of information systems. More particularly, this invention relates to a method and apparatus for analyzing the performance of an information system.

2. Art Background

An information system commonly includes one or more servers and related resources that provide information services to one or more users. Such servers may include web servers, email servers, proxy servers, or other types of servers depending on the nature of information services being provided. Typically, each user employs a computer or other access device to access information from the servers.

Providers of information services commonly seek to assess the quality of service being provided to their users in terms of performance. Such an assessment of performance if available would be useful for a variety of applications. For example, an assessment of performance may be useful for determining whether additional capacity is needed in the information system. In addition, an assessment of performance may be useful in providing service guarantees to users or in generating alarm conditions whenever the assessed performance falls below a desired performance level.

An assessment of the performance of an information system may be based on one or more of a variety of measurements such as data throughput or response time to user requests, etc. It is usually preferable that an assessment of performance apply the aggregate of users because the time and costs involved in tracking the performance for each and every user may be prohibitive.

One prior method for assessing the performance of an information system is to retrieve and analyze the information contained in subscriber logs which are commonly maintained in servers. These subscriber logs usually include information such as the time of access, subscriber addresses, the data transfer size, and the total time for the data transfer for each data transfer.

Unfortunately, it is usually not easy to assess the performance being provided to the aggregate of users from the information contained in subscriber logs. For example, differing users commonly engage in server communication using differing data transfer sizes. In addition, differing users commonly use computers having differing system performance, differing configurations, and differing network connection speeds. This variability among users usually makes it difficult to apply the information contained in a subscriber log toward a meaningful assessment regarding the aggregate of users. Moreover, transient periods of relatively high or relatively low server accesses can distort the information contained in subscriber logs in terms of a meaningful assessment of the performance of an information system.

SUMMARY OF THE INVENTION

A method and apparatus for analyzing the performance of an information system is disclosed which provides useful assessments of performance that apply to an aggregate of user nodes in the information system. The method and apparatus may be embodied in a performance analyzer which bases an assessment of the performance of the information system on a set of measurements of a performance parameter for all of the user nodes. The measurements in raw form apply to the individual user nodes. The performance analyzer determines a set of filtered measurements by removing at least one type of variability in the measurements. The performance analyzer then determines a representative performance indication in response to the filtered measurements such that the representative performance indication applies to an aggregate of the user nodes. Information system operators are provided with indications of confidence in the applicability of filtered measurements to the aggregate of user nodes and are provided with alarms that are weighted by the indications of confidence.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
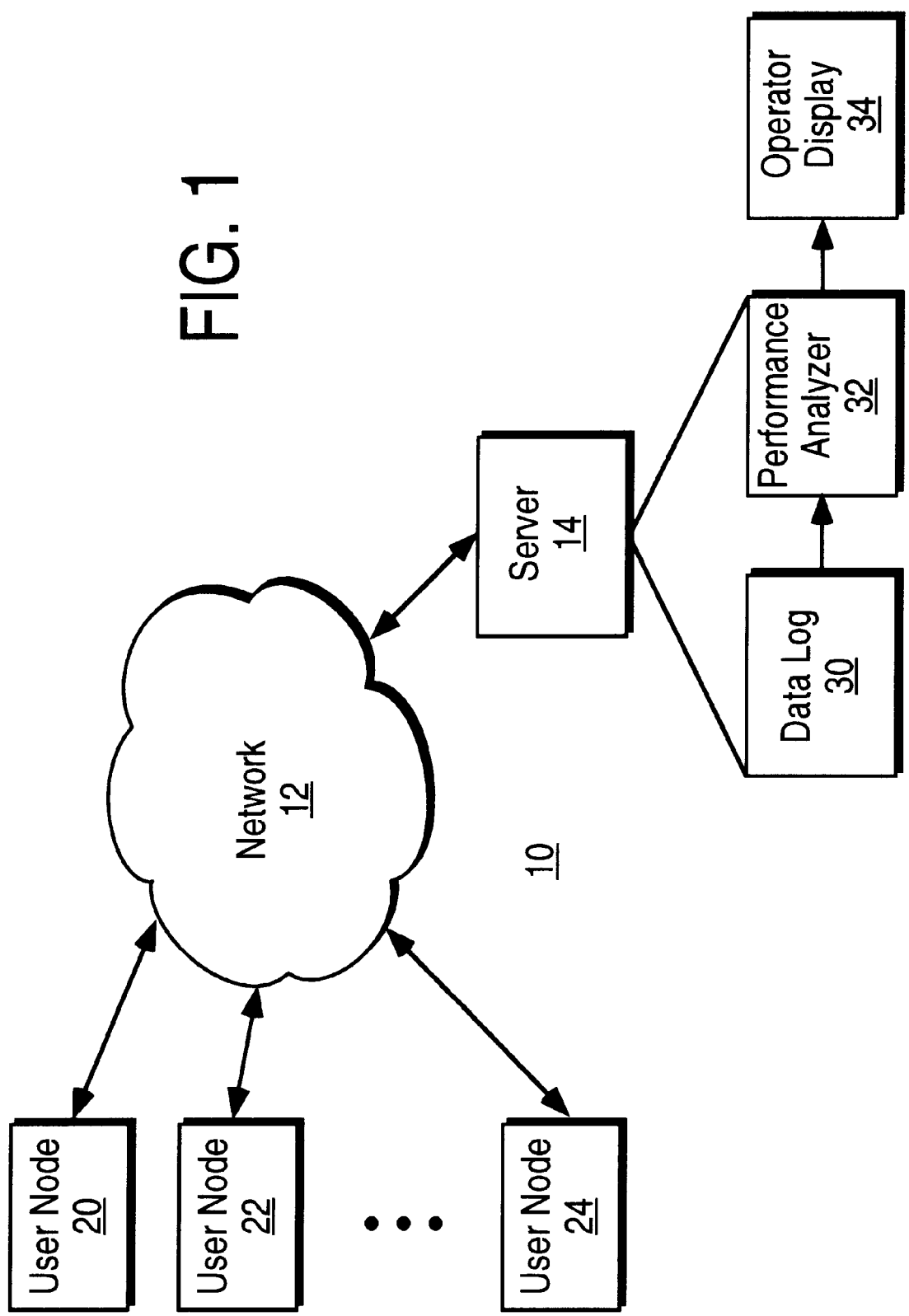
FIG. 1 illustrates an information system which includes elements for analyzing the performance of the information system with respect to an aggregate of users.

FIG. 1 illustrates an information system 10 which includes elements for analyzing performance from the point of view of an aggregate of users. The information system 10 in this example embodiment includes a set of user nodes 20–24 that access information from a server 14 via a network 12.

The network 12 represents any network that is capable of enabling a client-server communication model. The network 12 may be a local area network, a wide area network, a transmission line, or the collective network commonly known as the Internet, or any combination of these.

The user nodes 20–24 represent computer systems including personal computers, web browsers which may be software implementations on computer systems or dedicated web access devices, as well those devices commonly known as network computers.

The server 14 represents a wide variety of types of information servers including web servers and email servers and proxy servers. The server 14 may encompass one or more physically distinct server machines. In one embodiment, the server 14 is a web server and the user nodes 20–24 communication with the server 14 by exchanging messages over the network 12 using the Hyper Text Transfer Protocol (HTTP).

A set of measurements that apply to the individual user nodes 20–24 are recorded in a data log 30 or are determined from parameters recorded in the data log 30. A performance analyzer 32 reads the measurements, filters the measurements to remove various sources of variability, and provides representative performance indications, alarms, and other indications that apply to the aggregate of the user nodes 20–24 possibly using an operator display 34. The performance analyzer 32 may be implemented in software in the server 14 or on another server that can access the data log 30 or may be embodied in a dedicated piece of equipment for providing the analysis techniques disclosed herein.

In general, there are many different performance measurements that may be used by the performance analyzer 32 to evaluate the performance level or quality of service in the information system 10. In one embodiment, throughput measurements are used as a performance measurement. In the case of web communication, throughput takes into account the overhead of protocol headers, acknowledgments and re-transmissions at the underlying layers such as Transmit Control Protocol/Internet Protocol (TCP/IP).

Alternatively, user perceived response time may be used as a performance measurement for analysis by the performance analyzer 32. The techniques disclosed herein with appropriate modifications can be used with measured response time data.

Throughput may be defined as the number of data bytes transferred divided by the time between the transmission of the first bit of data by the source and the reception of the last bit by the destination. All the methods described herein approximate this definition of throughput because measurement of the above time interval can not be done precisely at the source or the receiver. Measurement of time at the receiver or the transmitter can only approximate the defined throughput due to finite propagation time.

Throughput may be measured by transmitting test data actively to and from the user nodes 20–24 over a period of time. This method may be referred to as active measurement of throughput. Alternatively, throughput may be measured by observing the traffic generated by the user nodes 20–24 over a period of time. This method may be referred to as passive measurement of throughput.

The active measurement of throughput has the advantage of complete control over the measurement process, and hence is especially useful during problem diagnosis for individual user nodes 20–24. However, active testing also has the disadvantage that additional network traffic needs to be generated solely for measurements. Due to traffic generation, active measurement worsens any congestion problem with an overhead that is proportional to the number of users that are monitored. Therefore it may not be desirable to obtain active measurements during congestion.

The passive measurement of throughput does not generate any additional traffic for measurements, and throughput values are collected continuously and recorded in the data log 30 throughout the operation of the service. In addition, the passive throughput measurement technique measures throughput for actual user traffic, rather than for perturbed workloads as is necessary for active throughput measurements. During times when the network 12 and the server 14 are under utilized, passive throughput measurements may not provide data, and active measurements may be necessary for monitoring possible fault conditions and may be obtained and recorded in the data log 30.

One method for obtaining passive measurements may be referred to as client-side passive measurement in which measurements are recorded at the user nodes 20–24 and then uploaded to the server 14 which records the measurements in the data log 30 for further analysis. However, this requires cooperation among users and the provider of the service and creates the additional traffic for data upload.

Another method for obtaining passive measurements may be referred to as server-side passive measurement which is based on an observation that if the amount of information transferred is large enough, throughput observed by the server 14 is likely to be a good approximation of the throughput observed by the user nodes 20–24. In addition, many web servers including the server 14 already log subscriber accesses, and each log entry includes information about the time of access, the IP address from which the subscriber accessed the system, the data transfer size, and the total time for the data transfer for each data transfer. The throughput achieved can be computed as the ratio of the transfer size to the transfer time and these measurements may be stored in the data log 30 for further analysis.

In one embodiment, server-side passive measurements recorded in the data log 30 are used to obtain throughput data points for analysis by the performance analyzer 32. Alternatively, a proxy server may be included in the information system 10 to provide a tradeoff between the server side and client side measurement techniques.

In general, measured values of throughput vary even during the normal operation of the information system 10. This is because throughput depends on many factors such as the user node 20–24 and the server 14 configurations, load on the user nodes 20–24 and the server 14, TCP parameters settings, TCP implementation, data transfer size, characteristics of the network 12, the capacity and round-trip delay of the network 12, the load on the network 12, and error characteristics of the network 12 links, etc. As a consequence, if the number of available throughput measurements are very small, then performance indications for users other than for those which measurements are available will be quite limited in accuracy. However, when many measurements with respect to many different user nodes 20–24 are available, then proper interpretation of the throughput measurements can provide indications of significant changes in operational conditions that result in unacceptable performance to most of the user population (e.g.. periods of extremely low, almost unacceptable, throughput caused by the occurrence of streams of network errors).

The performance analyzer 32 processes the performance measurements, which in one embodiment are throughput measurements, to meet a set of analysis goals set forth below:

Goal for Frequent Measurement

Throughput measurements should be performed frequently to provide meaningful conclusions. Statistical analysis can remove the variations across the user nodes 20–24 and across time. Furthermore, the time window for statistical analysis should be carefully chosen. Choosing too small a window may highlight sporadic problems, whereas choosing too large a window may prevent interesting problem trends from being noticed (e.g., occurrence of low throughput at specific times during each day).

Goal for Restricted Data Transfer Size

In general, observed throughput is a monotonic non-decreasing function of data transfer size. The larger the data transfer size, the greater is the impact of the network errors and congestion losses on the measured value of throughput. Hence, the data transfer size should be carefully chosen such that it captures service degradation effects, and a specified constant data transfer size, or a small range of data transfer sizes, should be used for the measurements. For passive measurements, only a range of data transfer sizes such that the expected throughput is similar for all transfer sizes in the range, should be used. Additional consideration with range selection is that the chosen range should include enough measurement data points.

Goal to Remove Variability in User Node Configuration and State

It will be appreciated that the measurement of throughput depends on configuration and state (e.g. running applications) of the user nodes 20–24, and that measured throughput values will vary with time even when they are measured against the same user node. Therefore, the throughput performance of the individual user nodes 20–24 at a particular time may not be indicative of performance being achieved by the user nodes 20–24 overall or at a different time instance.

Nevertheless, useful conclusions about the performance may be drawn by measuring throughput against the multiple user nodes 20–24 chosen at random. To avoid biasing results it is preferable to select a new set of test user nodes from among the user nodes 20–24 at each analysis period. Due to lack of control over passive measurements, the passive measurement data obtained from the data log 30 must be carefully filtered to remove variability in the user nodes 20–24 and application performance. In addition, to avoid unnecessary false alarms caused by one or a few bottleneck user nodes 20–24, the bottleneck effects of a few of the user nodes 20–24 should be removed.

Goal for Baseline Performance

To obtain meaningful representative performance indications, the measured throughput values should be compared against a desired baseline performance that the service provider seeks to achieve. An example of a baseline performance is that over a one hour interval, there is a high probability that aggregate user population will receive throughput greater than or equal to 2 Mbps for at least 80% of the time.

The analysis period over which statistical analysis and comparison with the baseline performance are undertaken should be specified. The criteria when warnings/alarms are triggered, the urgency of the alarms, etc., are under service provider control. In general, alarm/warning generation is aimed at (i) alerting service provider when users are unsatisfied with the performance of the service they are receiving, (ii) indicating the degree to which the service has degraded (a measure of ("badness"), thereby also indicating the urgency with which repair is necessary.

Goal for Comparing Measured and Baseline Performance

While monitoring throughput trends and aggregate user satisfaction, the measured throughput values should be compared against an operator specified baseline throughput. A direct comparison of measured values of throughput with a baseline may be performed so that a warning is generated as soon as the measurements fall below the baseline. This does not account for the fact that some throughput measurements may not be an accurate representative of user-perceived performance, that one or more of the user nodes 20–24 may be the cause of throughput degradation and might be contributing to many measurements, or that many measurements might have been made in a small time interval when the service was temporarily bad. Therefore, to determine correct conclusions about the network condition and average user satisfaction, statistical analysis techniques may be employed for comparing the measured throughput values with the baseline over a period of time while taking into account all the variability associated with throughput measurements.

In addition, reliability on the collected data should be based on the number of the user nodes 20–24 generating data points in an analysis period. A higher number of the user nodes 20–24 generating data points provides better representation of the user nodes 20–24 by the available data points. Hence, when the number of the user nodes 20–24 that are active is high, more available data points may be used for assessing typical user satisfaction.

Due to differing user configurations, the relative number of data points from various of the user nodes 20–24 should be appropriately accounted. A throughput analysis should take into account the relative contributions of the different user nodes 20–24 to the throughput measurements. In deciding status of user satisfaction, the performance analyzer 32 should not only take into account the number of the user nodes 20–24 contributing to a majority of the measurements, but should also account for the relative number of data points from each of the user node 20–24. The number of measurements from the distinct user nodes 20–24 in a sampling interval should be appropriately accounted.

In addition, the clustering of measurement data points should be taken into account and the effects of clustering should be filtered. For example, most of the measured throughput values may be clustered in a particular interval, possibly due to some transient conditions in which service performance is temporarily degraded. An analysis of the accumulated data without regard to clustering of data points in time may conclude degraded service performance over the entire period even though the performance was degraded only during a small fraction of time.

The analysis performed by the performance analyzer 32 provides pro-active monitoring of the service levels being offered to a majority of the user nodes 20–24 over a relatively long period of time. Problems affecting a relatively low number of the user nodes 20–24 or transient problems may be handled by some other mechanism.

An operator of the information system 10 specifies a desired baseline performance in the information system 10. The desired baseline performance is specified with a targeted baseline, a data transfer size, and an analysis period.

The targeted baseline performance is a baseline against which the throughput values recorded in the data log 30 are to be compared. In one embodiment, the targeted baseline includes both a desired baseline and a minimum baseline to provide for flexibility. An example baseline is as follows: it is desired that aggregate user throughput within an hour should be above $B_{X,desired}$ for more than X percent of time. The throughput must also be above $B_{X,minimum}$ for more than X percent of the time. $B_{X,desired}$ represents the desired throughput, and $B_{X,minimum}$ represents the minimum acceptable throughput that any of the user nodes 20–24 should experience. $B_{X,desired}$ may be viewed as the desired performance levels achieved by a group of users, whereas $B_{X,minimum}$ represents the performance that should be met by almost all the users. $B_{X,desired}$ and $B_{X,minimum}$ may be identical.

The data transfer size (T) specifies a data transfer size or a range of data transfer sizes that are used by the performance analyzer 32 for further analysis. The analysis period (P) is the time period over which throughput values are compared against the baseline—e.g., once every hour. The sampling interval (S) is used to address the problems associated with clustering of data with time and the ability of temporary situations to affect most of the data points.

To minimize the measurement overheads, the performance analyzer 32 may use a combination of passive and active measurement. Passively collected measurements are filtered with respect to data transfer size T to include only those measurement points for which the associated data transfer size T lies in a specified range. During every sampling interval S, the performance analyzer 32 can check if the passive measurements have yielded sufficient data, and if not, can schedule active measurement. Alternatively, active measurements can be performed periodically, but at a much lower frequency than if they were the only measurements. All further data analysis is performed on the combined filtered data.

The performance analyzer 32 determines a data reliability parameter (DRP) and a representative throughput value ($Q_X$). The performance analyzer 32 then uses the DRP and $Q_X$ to determine a user population dissatisfaction factor (DSF). The data reliability parameter DRP indicates the confidence that an operator should have on the measured throughput values as representing performance perceived by most of the user nodes 20–24. The throughput value $Q_X$ is obtained by filtering the raw measurement data obtained from the data log 30 to account for simultaneous multiple connection and clustering effects. The dissatisfaction factor DSF represents service degradation with respect to the specified desired baseline.

More specifically, the reliability parameter DRP helps in selecting an appropriate baseline point in the range $B_{X,desired}$ and $B_{X,minimum}$ against which the measured throughput value $Q_X$ should be compared. The selected baseline point is selected to be closer to the desired baseline performance $B_{X,desired}$ when there is high confidence on the data as being a representative of user population. The selected baseline may be selected to be closer to minimum acceptable performance $B_{X,minimum}$ as the confidence that the collected data represents entire user population decreases.

Figure 2:
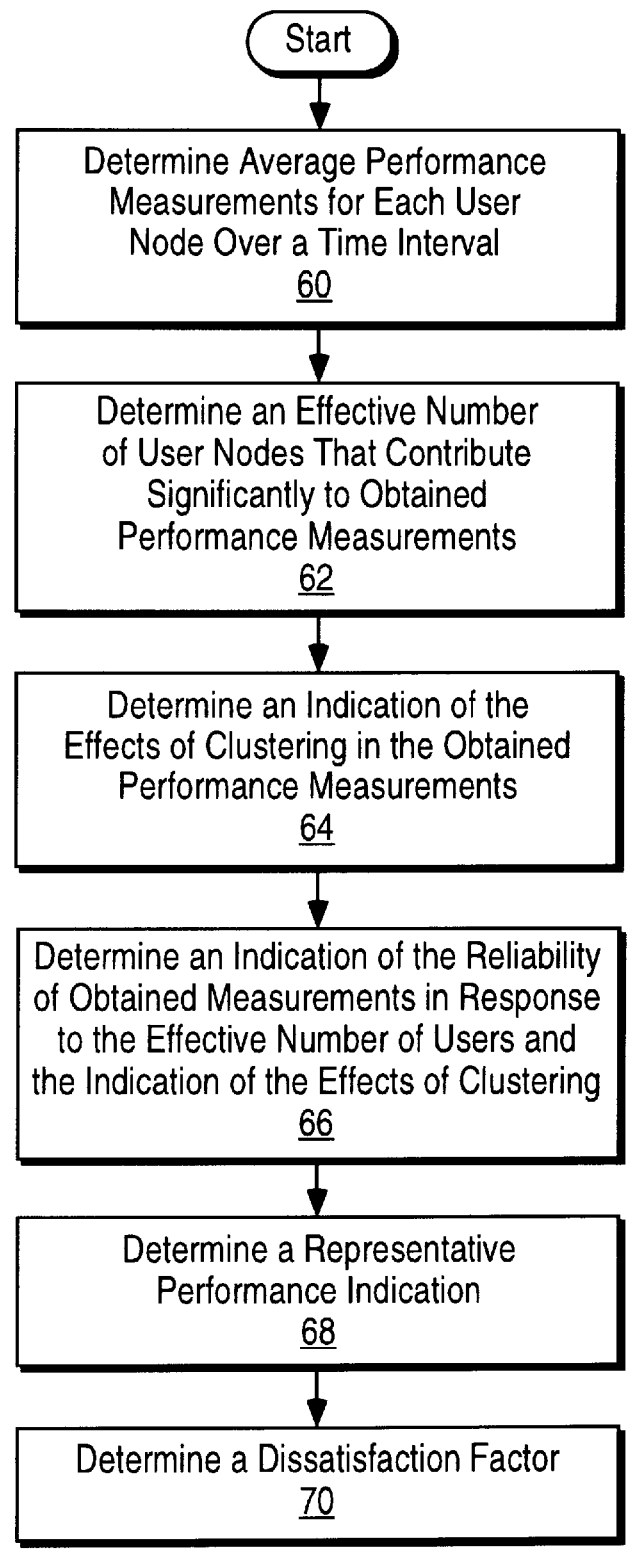
FIG. 2 shows a method for performance analysis and alarm generation in one embodiment.

FIG. 2 shows a method for performance analysis that meets the above goals. The performance analyzer 32 performs steps 60–70 during an analysis period.

Averaging

At step 60, the performance analyzer 32 averages throughput values measured from the same user node over a time interval or each of the user nodes 20–24. This average is the total bytes transferred divided by the total time taken to transfer and these parameters are recorded in the data log 30. The web data transfer protocol HTTP opens simultaneous multiple connections per web request to get inline images etc., and each of these connections can achieve varying throughput. Since user web experience depends on aggregated data transfer, the averaged throughput value determined at step 60 better represents a web experience. The time interval over which averaging is performed is A. In one embodiment, the time interval A is one minute. Averaging of requests within 1 minute effectively averages simultaneous data transfers due to multiple client connections, and yields one throughput value per user node 20–24 per web request. It is also possible that a user launches subsequent web requests within a very short time—less than a minute, for example. In that case, there is averaging across multiple web requests from the same user node. Since service conditions are not expected to change much within such a short time interval, it is still appropriate to aggregate such requests. All further analysis by the performance analyzer 32 is performed on the average data points that step 60 yields.

Determination of the Effective Number of Users

At step 62, the performance analyzer 32 takes into account the number of user nodes 20–24 contributing to significant number of data points to avoid the pitfall of drawing incorrect conclusions in a situation where many data points are from one of the user nodes 20–24, but very few from all the other user nodes 20–24. For this, the performance analyzer 32 determines a number (n) of all the distinct user nodes 20–24 contributing to the measurements in an analysis period.

The performance analyzer 32 then determines a user reliability parameter (URP) which indicates confidence with respect to the different user nodes 20–24 that have contributed to data points. A higher URP indicates a higher confidence on more uniform data contribution by various user nodes 20–24. The user reliability parameter URP is a monotonic non-decreasing function of n and is always between 0 and 1. In addition, if the number of user nodes 20–24 contributing is more than the minimum number of distinct user nodes 20–24 necessary to have statistical confidence on the obtained data points as representing entire user population, as per law of large numbers, then URP is equal to 1. This minimum number of distinct users is N. In one embodiment, the performance analyzer 32 determines a user reliability parameter (URP) having the above qualities according to the following:

$$URP = \min\left(1, \frac{n}{N}\right)$$

In other embodiments, other functions that meet the above criteria may be used to determine a user reliability parameter URP.

The performance analyzer 32 takes into account the relative number of measurements obtained from each user node 20–24 in order to take into account possible nonuniformity of data point generation by various users. For this, the above URP determination is modified so that n represents the minimum subset of the user nodes 20–24 that collectively contribute to a majority of the measurements. For example, n may be chosen as the minimum number of users which contribute to 75% of data points. Here, 75% includes most of the data points, but not all. The user reliability parameter URP accounts for spatial or network topology variability among the user nodes 20–24 and for configuration variability of the user nodes 20–24.

Accounting For and Removal of Cluster Effect

At step 64, the performance analyzer 32 divides the time-axis into small sampling intervals and associates an interval reliability parameter (IRP) with each sampling interval S within the analysis period P under consideration. The performance analyzer 32 also associates a cluster parameter (CP) with the analysis period P.

The cluster parameter CP has the following properties. First, when the number of measurements in each sampling interval within the analysis period P are the same, CP is equal to confidence on the measurements in each sampling interval, i.e., $IRP_i$ for all i. Second, when $IRP_i$ differs across all i, CP is proportional to the average confidence across intervals, i.e. average $IRP_i$. However, from the average $IRP_i$ value alone, it may not be possible to predict whether there is a significant variation between $IRP_i$ values for different $S_i$ values. Since for the same average $IRP_i$, uniform values of $IRP_i$ across the intervals indicate more reliable data than widely varying values across intervals, CP is also inversely proportional to the fluctuations in $IRP_i$ values and decreases with increased discrepancies in the number of data points across $S_i$ values. Finally, CP is always between 0 and 1. In one embodiment, the performance analyzer 32 determines a cluster parameter CP having the above qualities according to the wing:

$$CP = \frac{avg_i(IRP_i)}{1 + max_i(IRP_i) - avg_i(IRP_i)}$$

In other embodiments, other functions that meet the above criteria may be used to determine a cluster parameter CP.

The interval reliability parameter for $S_i$, namely $IRP_i$, is a function of the number of measurement data points $m_i$ in the sampling interval $S_i$. The interval reliability parameter $IRP_i$ increases monotonically with rate of increase in $m_i$, and is between 0 and 1. In one embodiment, the performance analyzer 32 determines an interval reliability parameter $IRP_i$ having the above qualities according to the following:

$$IRP_i = 1 - \frac{1}{1+m_i}$$

In other embodiments, other functions that meet the above criteria may be used to determine an interval reliability parameter $IRP_i$.

While the clustering parameter CP accounts for the clustering effect, it does not solve the biasing problem in which the overall percentile calculations are biased on data points clustered in one or few sampling intervals. To solve this biasing problem, the performance analyzer 32 limits the maximum number of data points that are selected from each sampling interval by further filtering the averaged data points of step 60. If any interval $S_i$ has more data points than the maximum, then the performance analyzer 32 sorts the data points in response to the associated throughput values and selects a number T of median values as a representative throughput values for $S_i$.

Determination of Overall Data Reliability

At step 66, the performance analyzer 32 uses the URP and CP values determined for an analysis period P as the basis for computing the overall data reliability parameter DRP for the analysis period P. Since greater confidence in the data points as representative of true user population should imply higher DRP, DRP dissatisfaction factor is proportional to both URP and CP. In one embodiment, the performance analyzer 32 determines a data reliability parameter DRP having the above qualities according to the following:

$$DRP = URP \cdot CP$$

In other embodiments, other functions that meet the above criteria may be used to determine a data reliability parameter DRP.

Representative Performance Determination

At step 68, the performance analyzer 32 determines a representative performance indication ($Q_X$) for the analysis period P. Accordingly, the performance analyzer 32 determines an X percentile value of filtered data points from step 64 over the analysis period. If over an analysis period P, there are less than a predetermined number of filtered data points, then the performance analyzer 32 discards this determination and the operator is informed via the operator display 34 that there are very few data points to be able to draw any meaningful conclusions about aggregate user satisfaction. In one embodiment, the predetermined number of filtered data points is equal to 5.

If there are a sufficient number of data points, then service performance is deemed to be unsatisfactory and the performance analyzer 32 generates an alarm if the computed percentile value X is less than the provider specified baselines $B_{X,desired}$ and $B_{X,minimum}$ weighted by the overall data reliability parameter DRP. The weighting should avoid unnecessary alarm generation due to biasing effects of poor performance offered to a few of the user nodes 20–24. When there is lower confidence on the data points as being representative of entire set of user nodes 20–24, then the collected data should be compared with the minimum service level. When there is a high confidence on the collected data as true representative of the user nodes 20–24, the collected data should be compared with the desired performance level.

An example of an alarm generation condition with the above desired properties is as follows. If the computed X percentile of data points filtered in step 64, denoted by $Q_X$, is such that $$Q_X < DRP \cdot B_{X,desired} + (1-DRP) \cdot B_{X,minimum}$$

then an alarm is generated.

Determination of Dissatisfaction Factor

At step 70, the performance analyzer 32 associates a dissatisfaction factor (DSF) with the above generated alarm whenever the representative performance indication is unsatisfactory. The dissatisfaction factor DSF increases with the increase in the difference between the representative performance indication $Q_X$ and the baseline performance which is $$DRP \cdot B_{X,desired} + (1-DRP) \cdot B_{X,minimum}$$

The DSF is the ratio of the above averaged difference between $Q_X$ and the baseline performance multiplied by the number of data points that are below the baseline performance, and the baseline performance multiplied by the total number of data points. The motivation for the above approach is that user satisfaction/dissatisfaction is proportional to the percentage difference from the desired baseline.

The steps 60–70 provide a method for analyzing and monitoring operational conditions in terms of service levels. The performance analyzer 32 may provide a web interface to facilitate instantaneous view of the satisfaction of the aggregate user population with respect to a specified baseline performance, and the reliability on the collected passive data as representative of aggregate user population, and also the representative performance indication. These results can help a service operator for the information system 10 to decide whether a particular condition requires immediate attention or not. If the results indicate high user dissatisfaction and high data reliability, then an immediate action should be most likely taken. If user dissatisfaction or data reliability is low, then the service operator may prefer to wait for some more time and observe if the condition is persistent before taking an action. The performance analyzer 32 may provide a graphical interface that indicates the type of problem. This graphical interface may be provided on the operator display 34 or on a display of a client node elsewhere on the network 12.

If problems occur occasionally then it might be an operational problem and need to be solved by repair, whereas if the problem persists despite possible maintenance, then it is most likely a capacity problem. Capacity planning can be done by applying the techniques disclosed above on longer terms (weeks and months). For example, $Q_X$ and DRP values can be recorded every hour, and then compared against longer term baseline over a longer time window (for example, weeks or months). This method reduces the amount of data that needs to be stored, and also displays useful information to network managers in a meaningful and concise form. If the analysis indicates service performance to be unacceptable or close to the minimum promised performance in a consistent basis with no operational problem, then the service operator should plan to either increase the capacity or modify the provided service.

There are several other possible approaches that can be used for generating warnings, alarms, determining warning/alarm criticalness, and for capacity planning. The method which is most suitable depends on the characteristics of a particular environment.

The techniques disclosed herein provide useful assessments of performance that apply to an aggregate of user nodes in an information system given the reliability problems associated with monitoring service levels of individual user nodes separately. Service providers are more likely to come up with targeted performance for the aggregate user population, and hope to meet service guarantees by proper selection of targeted performance and by providing enough capacity and continuous monitoring to make sure that targeted performance objectives are being achieved. Targeted performance baselines are chosen such that if internal operations achieve performance equal to or better than specified performance objectives, then there is a sufficiently high likelihood that most of the time the individual users will achieve performance equal to or better than the specified service guarantees. To make sure that service guarantees are met, targeted baselines will in general require better performance than specified service guarantees. For example, a service guarantee might specify that most user should achieve throughput greater than or equal to 128 Kbps 95 percent of time, and the corresponding target baseline may specify that aggregate user population should receive throughput greater than or equal to 150 Kbps 98 percent of the time.

Figure 3:
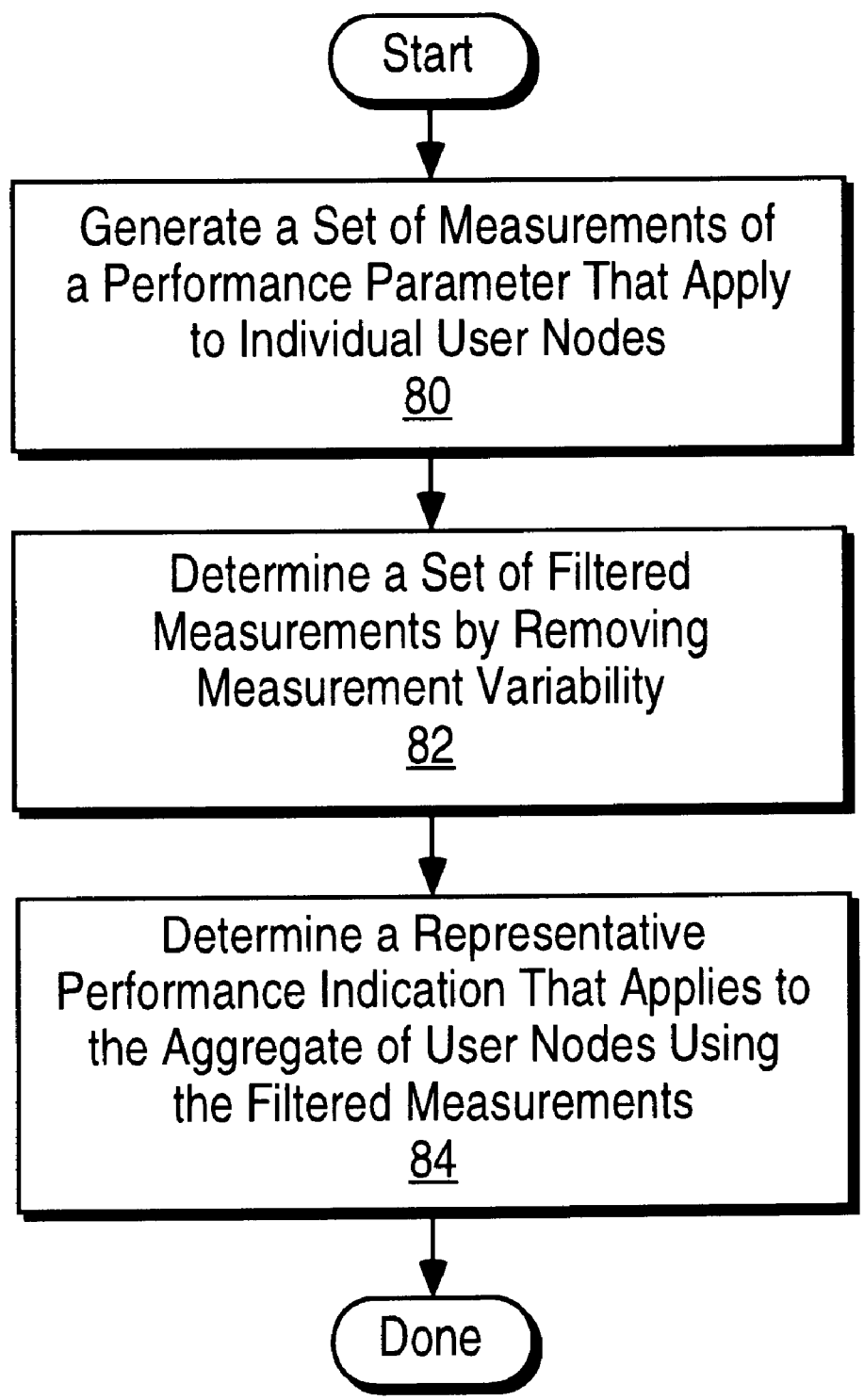
FIG. 3 shows a set of basic steps involved in analyzing the performance of an information system.

FIG. 3 shows a set of basic steps 80–84 involved in analyzing the performance of an information system which summarize the above description.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for analyzing the performance of an information system, comprising the steps of:

generating a set of measurements of a performance parameter for each of a set of user nodes in the information system such the measurements apply to the user nodes individually;

determining a set of filtered measurements by removing at least one type of variability in the measurements;

determining a representative performance indication in response to the filtered measurements such that the representative performance indication applies to an aggregate of the user nodes.

2. The method of claim 1, wherein the type of variability in the measurements is caused by differing data transfer sizes associated with the user nodes.

3. The method of claim 1, wherein the type of variability in the measurements is caused by a time variation in activity associated with the user nodes.

4. The method of claim 1, wherein the type of variability in the measurements is caused by differing configurations of the user nodes.

5. The method of claim 1, wherein the type of variability in the measurements is caused by differing states associated with the user nodes.

6. The method of claim 1, wherein the type of variability in the measurements is caused by differing network topologies associated with the user nodes.

7. A method for analyzing the performance of an information system, comprising the steps of:

generating a set of measurements of a performance parameter for each of a set of user nodes in the information system such the measurements apply to the user nodes individually;

determining a set of filtered measurements by removing at least one type of variability in the measurements;

determining a representative performance indication in response to the filtered measurements such that the representative performance indication applies to an aggregate of the user nodes, wherein the step of determining a set of filtered measurements includes the steps of:

selecting the measurements having a data transfer size within a preselected range;

averaging the selected measurements over multiple accesses by each of the user nodes.

8. The method of claim 7, wherein the step of determining a set of filtered measurements further comprises the steps of:

subdividing the selected measurements into a series of sample intervals;

associating with each sample interval an interval reliability parameter that indicates a confidence level for the selected measurements;

determining a clustering parameter for an analysis period in response to the interval reliability parameters.

9. The method of claim 8, further comprising the step of determining a user reliability parameter that indicates a confidence level in uniformity of the selected measurements from the user nodes.

10. The method of claim 9, further comprising the step of determining a data reliability parameter for the analysis period in response to the user reliability parameter and the clustering parameter such that the data reliability parameter indicates a confidence that the filtered measurements sufficiently represent the user nodes.

11. The method of claim 10, further comprising the steps of generating an alarm condition if the representative performance indication is below a desired baseline.

12. The method of claim 11, wherein the alarm condition is generated only if the data reliability parameter is above a predetermined level.

13. An apparatus for analyzing the performance of an information system, comprising:

means for generating a set of measurements of a performance parameter for each of a set of user nodes in the information system such the measurements apply to the user nodes individually;

means for determining a set of filtered measurements by removing at least one type of variability in the measurements;

means for determining a representative performance indication in response to the filtered measurements such that the representative performance indication applies to an aggregate of the user nodes.

14. The apparatus of claim 13, wherein the type of variability in the measurements is caused by differing data transfer sizes associated with the user nodes.

15. The apparatus of claim 13, wherein the type of variability in the measurements is caused by a time variation in activity associated with the user nodes.

16. The apparatus of claim 13, wherein the type of variability in the measurements is caused by differing configurations of the user nodes.

17. The apparatus of claim 13, wherein the type of variability in the measurements is caused by differing states associated with the user nodes.

18. The apparatus of claim 13, wherein the type of variability in the measurements is caused by differing network topologies associated with the user nodes.

19. An apparatus for analyzing the performance of an information system, comprising:

means for generating a set of measurements of a performance parameter for each of a set of user nodes in the information system such the measurements apply to the user nodes individually;

means for determining a set of filtered measurements by removing at least one type of variability in the measurements;

means for determining a representative performance indication in response to the filtered measurements such that the representative performance indication applies to an aggregate of the user nodes, wherein the means for determining a set of filtered measurements comprises:

means for selecting the measurements having a data transfer size within a preselected range;

means for averaging the selected measurements over multiple accesses by each of the user nodes.

20. The apparatus of claim 19, wherein the means for determining a set of filtered measurements further comprises:

means for subdividing the selected measurements into a series of sample intervals;

means for associating with each sample interval an interval reliability parameter that indicates a confidence level for the selected measurements;

means for determining a clustering parameter for an analysis period in response to the interval reliability parameters.

21. The apparatus of claim 20, further comprising means for determining a user reliability parameter that indicates a confidence level in uniformity of the selected measurements from the user nodes.

22. The apparatus of claim 21, further comprising means for determining a data reliability parameter for the analysis period in response to the user reliability parameter and the clustering parameter such that the data reliability parameter indicates a confidence that the filtered measurements sufficiently represent the user nodes.

23. The apparatus of claim 22, further comprising means for generating an alarm condition if the representative performance indication is below a desired baseline.

24. The apparatus of claim 23, wherein the alarm condition is generated only if the data reliability parameter is above a predetermined level.

* * * * *